United States Patent [19]

Nago

[11] Patent Number: 4,771,413
[45] Date of Patent: Sep. 13, 1988

[54] OPTICAL RECORDING AND REPRODUCING APPARATUS

[75] Inventor: Chiaki Nago, Yokohama, Japan

[73] Assignee: Kabushiki Kaisha Toshiba, Kawasaki, Japan

[21] Appl. No.: 37,056

[22] Filed: Apr. 13, 1987

Related U.S. Application Data

[63] Continuation of Ser. No. 705,307, Feb. 25, 1985, abandoned.

[30] Foreign Application Priority Data

Mar. 7, 1984 [JP] Japan .................................. 59-43386

[51] Int. Cl.$^4$ .............................................. G11B 7/12
[52] U.S. Cl. .................................... 369/109; 369/110; 369/111; 346/76 L
[58] Field of Search ............... 369/111, 121, 122, 110, 369/109; 346/76 L

[56] References Cited

U.S. PATENT DOCUMENTS

| 3,736,046 | 5/1973 | Zook | 346/76 L |
| 4,085,423 | 4/1978 | Tsunoda | 369/122 |
| 4,225,873 | 9/1980 | Winslow | 369/110 |
| 4,564,931 | 1/1986 | Ohara | 369/122 |

Primary Examiner—Alan Faber
Attorney, Agent, or Firm—Cushman, Darby & Cushman

[57] ABSTRACT

An optical recording and reproducing apparatus with a first light source for generating a recording laser beam, a second light source for generating a reproducing beam which has shorter wavelength than that of the recording laser beam. Information is recorded by forming pits on a recording member by the recording laser beam, and reproduced by directing the reproducing laser beam onto the pits and obtaining the beam reflected beam from the pits.

3 Claims, 4 Drawing Sheets

OPTICAL RECORDING AND REPRODUCING APPARATUS

This is a continuation of application Ser. No. 705,307, filed Feb. 25, 1985, which was abandoned upon the filing hereof.

BACKGROUND OF THE INVENTION

1. Field of the Invention

This invention relates to optical recording/reproducing apparatus such as an optical disc unit which uses optical discs for recording or reproducing.

2. Description of the Prior Art

An optical disc unit records or reproduces information optically by directing a laser beam onto an optical disc. Recently, optical disc units are finding many useful applications such as large-capacity information filing.

An optical disc is made with groove tracks, called "pregrooves", formed spirally or concentrically on the disc, and a recording beam forms pits in the pregrooves to record data. To reproduce, a beam is applied to the grooves and the pits detected from the difference in the amount of light reflected after passage through the pits. The reproducing beam and the higher energy recording beam are derived from a single laser beam. A problem exists, however, that the reproducing beam cannot be reflected from the recording pits unless the diameter of each recording pit is greater than the wavelength of the reproducing beam. If the recording beam has the same wavelength as the reproducing beam, reflection from the recording pit and correct reproduction are difficult.

SUMMARY OF THE INVENTION

The present invention provides an optical recording/reproducing apparatus that overcomes these problems. The apparatus of the present invention includes a first light source for generating a recording laser beam, and a second light source for generating a reproducing laser beam which has a shorter wavelength than that of the beam generated from the first light source. Information is recorded by forming pits on a recording member by the beam generated from the first light source, and reproduced by directing the laser beam from the second light source onto the pits and detecting the beam reflected from the pits.

BRIEF DESCRIPTION OF THE DRAWINGS

These and other objects and advantages of this invention will become apparent and more readily appreciated from the following detailed description of the presently preferred exemplary embodiment read in conjunction with the accompany drawings, wherein.

DETAILED DESCRIPTION OF THE PRESENTLY PREFERRED EXEMPLARY EMBODIMENT OF THIS INVENTION

Figure 1:
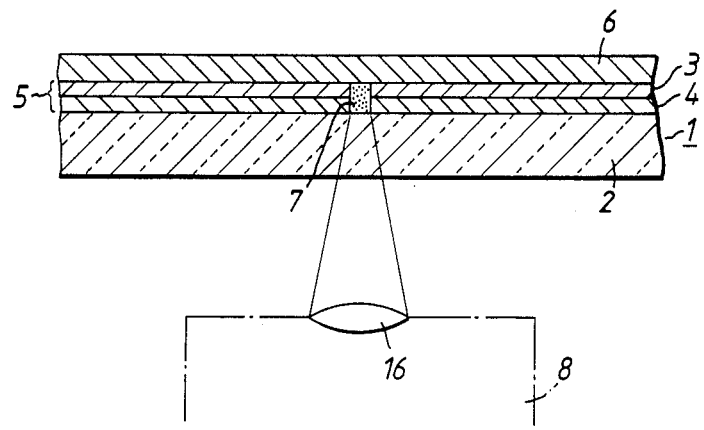
FIG. 1 shows a sectional view of an optical disc for explaining the present invention.

In FIG. 1, optical disc 1 is an optical recording medium with pregroove tracks formed spirally on the surface thereof. Optical disc 1 is rotated by a motor (not shown in the drawing). Disc 1 is made up of a laminate consisting of recording layer 5 which comprises two thin films 3 and 4 having different optical reflection coefficients and which is placed between a transparent substrate 2 formed of acrylic resin or glass, and an aluminum plate 6 acting as a reflector. Thin film 3 is formed from germanium which has a small optical extinction coefficient while film 4 is formed from aluminum having a larger optical extinction coefficient (also known as coefficient of absorbtion). Thin film 3 is translucent. At the position of the spot to which recording laser beam is directed, thin films 3 and 4 are mutually diffused to extinguish the boundary therebetween and then a transparent thin region, i.e. recording pit 7, having a different optical extinction coefficient, is formed.

Figure 2:
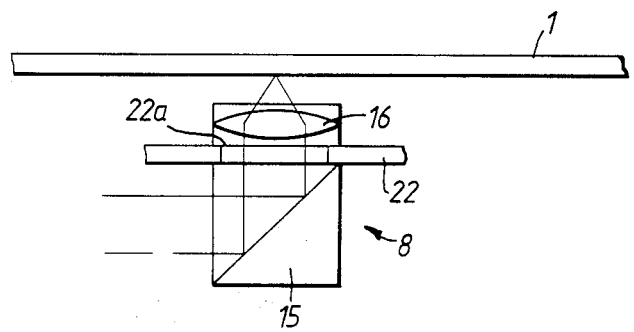
FIGS. 2-4 show the configurations of the optical head.
Figure 3:
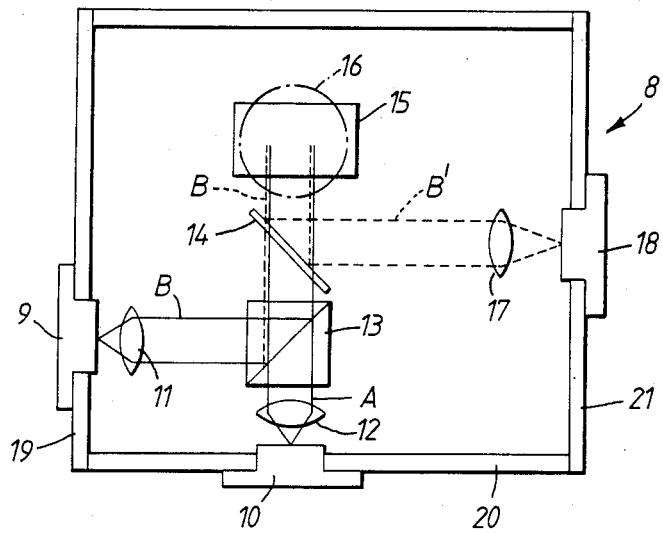
Figure 4:
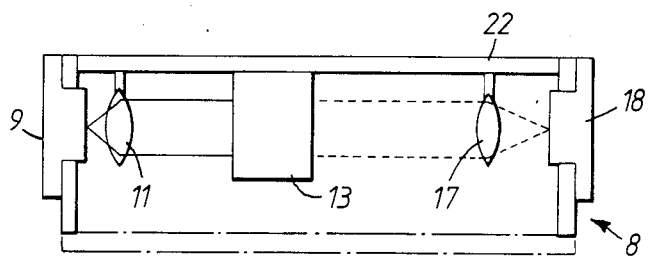

Optical head 8 is used for both recording and reproducing, and is linearly moved in the radial direction of optical disc 1 by a conventional linear motor mechanism (not shown). Optical head 8, as shown in FIGS. 2 to 4, include a semiconductor laser oscillator 9 as the second light source which produces a laser beam having a wavelength of 0.78 $\mu$m for reproducing, semiconductor laser oscillator 10 as the first light source which produces a laser beam having a wavelength of 0.83 $\mu$m for recording, collimator lenses 11 and 12, deflection beam splitter 13, half mirror 14, total reflection mirror 15, objective lens 16, condenser lens 17 and photodiode 18 which converts reflection from optical disc 1 into an electric signal. Semiconductor laser oscillators 9 and 10 are mounted by screws (not shown) to side plates 19 and 20. Collimator lenses 11 and 12, deflection beam splitter 13, half mirror 14, total reflection mirror 15 and condenser lens 17 are all fixed to a ceiling board. Under side plates 19, 20 and 21, a bottom board 23 is mounted by screws (not shown).

Laser beam A from semiconductor laser oscillator 10 is collimated by lens 12, and guided to total reflection mirror 15 via beam splitter 13 and half mirror 14. The beam reflected from total reflection mirror 15 is directed to objective lens 16 and converged to a 0.83 $\mu$m diameter spot beam before being directed onto optical disc 1. Laser beam B from semiconductor laser oscillator 9 is similarly collimated by lens 11, and guided to total reflection mirror 15 via beam splitter 13 and half mirror 14. The beam reflected from total reflection mirror 15 is directed to objective lens 16 and converged to a 0.78 $\mu$m diameter spot beam before being directed onto optical disc 1. Reflection beam B' from optical disc 1 is guided to half mirror 14 via objective lens 16 and total reflection mirror 15, where reflection beam B' is again reflected and directed to condenser lens 17. The resulting condensed beam is then converted into an electrical signal.

Figure 5:
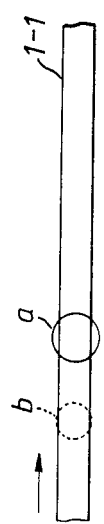
FIG. 5 shows the relation between the spot beam of the recording beam and the spot beam of the reproducing beam.

Two light beams—recording beam A and reproducing beam B—pass through objective lens 16. As shown in FIG. 5, the 0.83 $\mu$m diameter spot beam a for recording beam A is directed by objective lens 16 along the data recording direction shown by an arrow in FIG. 5 onto track 1—1 of optical disc 1, while the 0.78 $\mu$m diameter spot b for reproducing is directed to a position behind spot a.

Figure 6:
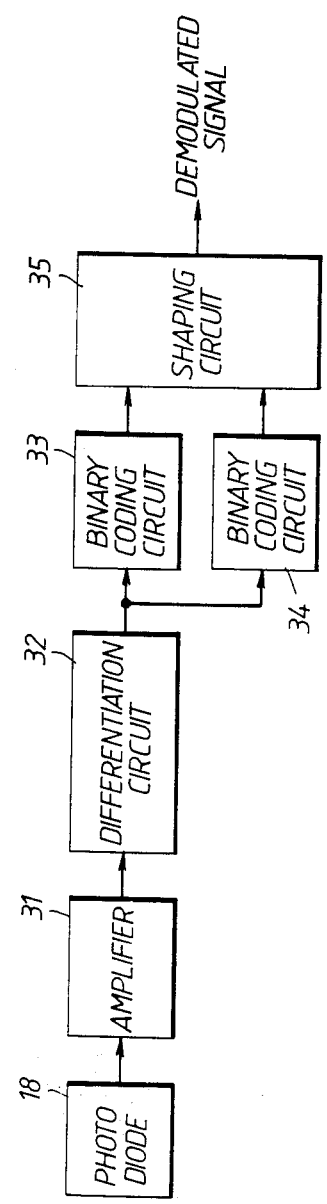
FIG. 6 is a block diagram of an electrical circuit.
Figure 7:
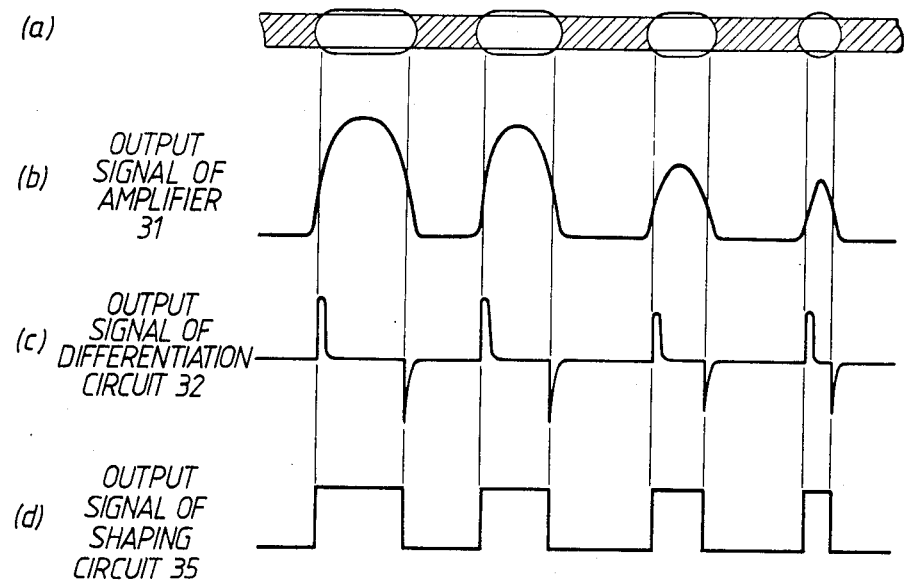
FIG. 7 shows the signal waveforms in the circuit of FIG. 6.

FIG. 6 shows a block diagram of the electrical circuit. In FIG. 6, the output signal from photodiode 18 is amplified by amplifier 31 as shown in FIG. 7(b), and the output signal from amplifier 31 is differentiated by differentiation circuit 32 as shown in FIG. 7(c). Binary coding circuit 33 is a circuit which binary-codes the positive side of the differential output of circuit 32, and binary coding circuit 34 is a binary coding circuit which binary-codes the negative side of the differential output. Shaping circuit 35 shapes the binary coded signals from circuits 33 and 34 to obtain a demodulated signal as shown in FIG. 7(d).

FIG. 7(a) shows the recording of data on tracks of optical disc 1 with the recording interval changed and with the size of each pit changed.

The operation of the present invention is as follows.

To record, optical head 3 is located adjacent optical disc 1 and reproducing beam B is produced by semiconductor laser oscillator 9. Beam B is collimated by collimator lens 11 and guided to deflection beam splitter 13. Reproducing beam B, reflected by deflection beam splitter 13 and passed through half mirror 14, is reflected by total reflection mirror 15 and directed to objective lens 16. Objective lens 16 converges the reproducing beam to a 0.78 μm diameter spot on optical disc 1.

A drive signal matching the data to be recorded activates semiconductor laser oscillator 10 to produce recording beam A. Beam A is collimated by lens 12, passed through deflection beam splitter 13 and half mirror 14, reflected by total reflection mirror 15 and directed to objective lens 16. Objective lens 16 converges recording beam A to a 0.78 μm diameter spot beam a on optical disc 1 as shown in FIG. 5. In this case, spot beam a for recording beam A is directed forward along the data recording direction on track 1—1 of optical disc 1, while spot beam b for reproducing beam B is directed to just behind beam a. Spot beam a is thus focused onto recording layer 5 of optical disc 1. Then the affected portions of thin films 3 and 4 are mutually diffused to extinguish the boundary thereof and new thin transparent region 7, i.e. a recording pit 7, formed.

Immediately after recording pit 7 has been formed, spot beam b for reproducing beam B is directed to that portion. Because the diameter of spot beam b (0.78 μm) is smaller than that of the recording pit 7 (0.83 μm), spot beam b passes accurately through recording pit 7 and is reflected by plate 6. This reflected beam is collimated by objective lens 16, reflected by total reflection mirror 15 and directed to half mirror 14. Beam B' reflected by mirror 15 is directed to condenser lens 17, and forms an image on photodiode 18, which then delivers an electrical signal matching that image to amplifier 31. Amplifier 31 amplifies the signal and delivers it to differentiation circuit 32. Circuit 32 differentiates the supplied signal, and produces a positive differential signal when the sensing signal of photodiode 18 rises and a negative differential signal when the sensing signal of photodiode 18 falls. The positive differential signal is binary-coded by circuit 33, while the negative signal is binary-coded by circuit 34. Binary-coded signals from binary-coding circuits 33 and 34 are shaped by circuit 35 to produce a correct demodulation signal that matches the diameter of recording pit 7. This demodulation signal allows checking whether or not the data has been correctly recorded, and permits correction responding to the result of the check.

This checking can be performed immediately after the data has been recorded, which provides an advantage over the conventional checking operation in which a certain time gap occur between recording and checking.

To reproduce, only reproducing beam B from semiconductor laser oscillator 9 is used. The demodulation signal derived from shaping circuit 35 is used as a reproducing signal. Thus, reproducing data which is the same as the recording data can be exactly obtained.

Figure 8:
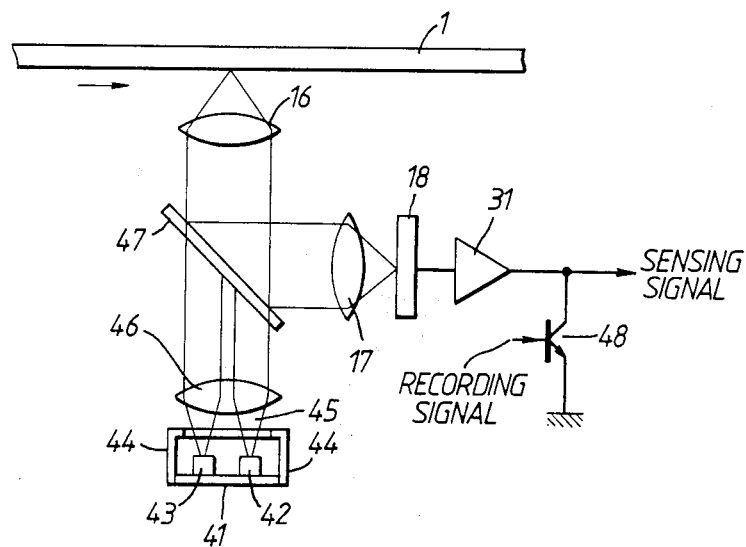
FIG. 8 shows the configuration of the optical head in another embodiment.

In the above embodiment, there are two separate semiconductor laser oscillators. However, they may be located together on the same substrate. More specifically, as shown in FIG. 8, semiconductor laser 42 which generates the recording beam and semiconductor laser oscillator 43 which generates the reproducing beam are formed together on substrate 41. On substrate 41, side plate 44 and glass ceiling board 45 are mounted. Two semiconductor laser oscillators 42 and 43 can be mounted in a cabinet comprising substrate 41, side plate 44 and ceiling board 45. The laser beams generated by semiconductor laser oscillators 42 and 43 are directed to objective lens 16 via collimator lens 46 and half mirror 47. Objective lens 16 directs a spot beam for recording forward along the data recording direction on optical disc 1, and a spot beam for reproducing just behind the recording spot beam. Reflections of the beam from the optical disc 1 are guided to condenser lens 17 via objective lens 16 and half mirror 47 to form an image on photodiode 18. In this case, the reflections of both recording beam and reproducing beam are directed to photodiode 18. For this reason, the output of photodiode 18 is amplified by circuit 31 and the amplified signal is masked and filtered by causing switching device 48 to be switched by a recording signal from semiconductor laser oscillator 42. Thus, photodiode 18 responds to only the signal that has been sensed by the reflection of the reproduction beam.

The means for generating recording/reproducing beams is not limited to a semiconductor laser oscillator but may be a helium or neon laser oscillator. The wavelengths of recording beam and reproducing beam are not limited "0.83 μm" and "0.78 μm", respectively, but may be any other wavelengths as long as they satisfy the condition that the wavelength of the recording beam is greater than that of the reproducing beam.

Furthermore, the materials of the two thin films forming the recording layer are not limited to germanium and aluminum, respectively, but may be any two different materials whose optical extinction coefficient ratio is 1.5 or greater and which have a large mutual diffusion coefficient at high temperatures. Suitable materials include germanium, tellurium, bismuth, titanium, tarium and alloys containing these materials as the main constituent. Those having large optical coefficient include tellurium, bismuth, tin, gold, silver, antimony, aluminum and alloys containing these materials as the main constituent.

Although only several preferred embodiments have been described in detail above, those skilled in the art will readily appreciate that many modifications are possible in the preferred embodiments without materially departing from the novel techniques and advantages of this invention. Accordingly, all such modifications are intended to be covered by this invention as described in the following claims.

What is claimed is:

1. An optical recording and reproducing system comprising:
   first light source means for generating a recording laser beam having a first wavelength and having a first diameter;
   second light source means for generating a reproducing laser beam which has a second wavelength of a shorter wavelength than said first wavelength of said first light source means, said reproducing laser beam having a second diameter smaller than said first diameter;
   a recording member having a substrate, a reflective layer, and a recording layer which is less reflective than said reflective layer, overlying said reflective layer;
   optical means for directing said recording laser beam from said first light source means onto said recording member to form a recorded area by rendering transparent a spot of said recording layer having said fixed diameter, and for directing said beam of said second diameter from said second light source means on to said recording member and obtaining a reflection beam from said recording member; and
   reproducing means for converting said reflection beam to a signal indicative thereof, to reproduce the information on said recording member according to said reflection signal.

2. An optical recording and reproducing apparatus according to claim 1, further including a housing for mounting said first light source means and said second light source means.

3. An optical recording and reproducing apparatus according to claim 1, wherein said optical means directs the laser beam from said second light source to a position forward along the data recording direction on the recording member from the position where the laser beam from said first light source is directed.

* * * * *